United States Patent
Perentes et al.

(10) Patent No.: US 8,919,242 B2
(45) Date of Patent: Dec. 30, 2014

(54) METHOD FOR PREPARING A FOOD LIQUID CONTAINED IN A CAPSULE BY CENTRIFUGATION AND SYSTEM ADAPTED FOR SUCH METHOD

(75) Inventors: Alexandre Perentes, Lausanne (CH); Christian Jarisch, Lutry (CH)

(73) Assignee: Nestec S.A., Vevey (CH)

( * ) Notice: Subject to any disclaimer, the term of this patent is extended or adjusted under 35 U.S.C. 154(b) by 26 days.

(21) Appl. No.: 13/061,558

(22) PCT Filed: Aug. 19, 2009

(86) PCT No.: PCT/EP2009/060697
§ 371 (c)(1),
(2), (4) Date: May 25, 2011

(87) PCT Pub. No.: WO2010/026045
PCT Pub. Date: Mar. 11, 2010

(65) Prior Publication Data
US 2011/0217421 A1    Sep. 8, 2011

(30) Foreign Application Priority Data
Sep. 2, 2008  (EP) .................................... 08163528

(51) Int. Cl.
*A47J 31/20* (2006.01)
*A47J 31/22* (2006.01)
*A47J 31/06* (2006.01)

(52) U.S. Cl.
CPC .............. *A47J 31/22* (2013.01); *A47J 31/0673* (2013.01)
USPC .......... 99/302 C; 99/295; 99/302 R; 426/425; 426/433

(58) Field of Classification Search
CPC ..... A47J 31/22; A47J 31/407; A47J 31/3642; A47J 31/002; A47J 31/0673; A47J 31/3623; A47J 31/3676; A47J 31/3695; A47J 31/20
USPC ................. 426/433, 431, 425, 115, 432, 394; 99/295, 302 R, 302 C
See application file for complete search history.

(56) References Cited

U.S. PATENT DOCUMENTS

| 239,659 A | 4/1881 | Houston |
| 1,963,426 A | 6/1934 | Taylor .............................. 97/233 |

(Continued)

FOREIGN PATENT DOCUMENTS

| AT | 197553 B | 5/1958 |
| BE | 894 031 A1 | 2/1983 |

(Continued)

OTHER PUBLICATIONS

BE 894031 A, Guerin A, Feb. 4, 1983, English Translation.*

(Continued)

*Primary Examiner* — Lien Tran
*Assistant Examiner* — Hong T Yoo
(74) *Attorney, Agent, or Firm* — Winston & Strawn LLP

(57) ABSTRACT

A method for preparing a food liquid from a food substance contained in a single-use capsule. The method includes passing water through the substance, driving the capsule in centrifugal rotation while introducing water into the center of capsule, passing water through the substance to form a food liquid, and piercing at least one liquid delivery outlet in the capsule at least partially by the effect of the pressure rising in the capsule as a result of the centrifugation.

16 Claims, 5 Drawing Sheets

(56) References Cited

U.S. PATENT DOCUMENTS

| | | | |
|---|---|---|---|
| 1,963,476 A | 6/1934 | Smith | 210/67 |
| 2,778,739 A | 1/1957 | Rodth | 99/171 |
| 2,899,886 A | 8/1959 | Rodth | |
| 2,952,202 A | 9/1960 | Renner et al. | |
| 3,025,781 A | 3/1962 | Bossi | |
| 3,233,535 A | 2/1966 | Fowlie | |
| 3,566,770 A | 3/1971 | Crossley | 99/289 |
| 3,654,852 A | 4/1972 | Rosan, Sr. | |
| 3,812,773 A | 5/1974 | Hultsch | 99/290 |
| 3,822,013 A | 7/1974 | Van Der Veken | 206/233 |
| 3,967,546 A | 7/1976 | Cailliot | 99/286 |
| 3,985,069 A | 10/1976 | Cavalluzzi | 99/295 |
| 4,136,202 A | 1/1979 | Favre et al. | |
| 4,426,919 A | 1/1984 | Rhoten | 99/289 |
| 4,464,982 A | 8/1984 | Leuschner et al. | 99/287 |
| 4,473,002 A | 9/1984 | Leuschner et al. | 99/302 |
| 4,545,296 A | 10/1985 | Ben-Shmuel | 99/289 |
| 4,584,101 A | 4/1986 | Kataoka | 201/474 |
| 4,806,375 A | 2/1989 | Favre | 426/433 |
| 4,846,052 A | 7/1989 | Favre et al. | |
| 4,859,337 A | 8/1989 | Woltermann | 210/474 |
| 4,962,693 A | 10/1990 | Miwa et al. | 99/289 |
| 5,047,252 A | 9/1991 | Liu et al. | 426/79 |
| 5,265,517 A | 11/1993 | Gilbert | 99/280 |
| 5,325,765 A | 7/1994 | Sylvan et al. | 99/295 |
| 5,343,799 A | 9/1994 | Fond | |
| 5,566,605 A | 10/1996 | Lebrun et al. | 99/302 |
| 5,637,335 A | 6/1997 | Fond et al. | 426/84 |
| 5,649,472 A | 7/1997 | Fond et al. | 99/295 |
| 5,656,311 A | 8/1997 | Fond | |
| 5,755,149 A | 5/1998 | Blanc et al. | 99/289 |
| 5,826,492 A | 10/1998 | Fond et al. | |
| 5,948,455 A | 9/1999 | Schaeffer et al. | 426/77 |
| 6,007,853 A | 12/1999 | Lesser | 426/77 |
| 6,607,762 B2 | 8/2003 | Lazaris et al. | 426/79 |
| 6,777,007 B2 | 8/2004 | Cai | 426/78 |
| 6,786,134 B2 * | 9/2004 | Green | 99/289 P |
| 6,849,285 B2 | 2/2005 | Masek et al. | |
| 6,854,378 B2 | 2/2005 | Jarisch et al. | |
| 7,017,775 B2 | 3/2006 | Zettle et al. | 220/781 |
| 7,153,530 B2 | 12/2006 | Masek et al. | |
| 7,216,582 B2 | 5/2007 | Yoakim et al. | 99/295 |
| 7,325,478 B2 | 2/2008 | Cautenet et al. | |
| 7,325,479 B2 | 2/2008 | Laigneau et al. | |
| 7,469,627 B2 | 12/2008 | Li | 99/286 |
| 7,569,242 B2 | 8/2009 | Barber et al. | |
| 7,569,243 B2 | 8/2009 | Yoakim et al. | |
| 7,770,512 B2 | 8/2010 | Albrecht | 99/295 |
| 7,981,451 B2 | 7/2011 | Ozanne | |
| 8,151,694 B2 * | 4/2012 | Jacobs et al. | 99/302 R |
| 8,307,754 B2 | 11/2012 | Ternite et al. | |
| 8,327,754 B2 | 12/2012 | Kirschner et al. | |
| 8,409,646 B2 | 4/2013 | Yoakim et al. | |
| 8,431,175 B2 | 4/2013 | Yoakim et al. | |
| 8,512,784 B2 | 8/2013 | Denisart et al. | |
| 2003/0116029 A1 | 6/2003 | Kollep | |
| 2003/0145736 A1 | 8/2003 | Green | 99/280 |
| 2003/0159593 A1 | 8/2003 | Leutwyler | |
| 2004/0255790 A1 | 12/2004 | Green | |
| 2005/0150390 A1 | 7/2005 | Schifferle | 99/295 |
| 2005/0188854 A1 | 9/2005 | Green et al. | |
| 2006/0003075 A1 | 1/2006 | Meador | |
| 2006/0110507 A1 | 5/2006 | Yoakim et al. | 426/433 |
| 2006/0196364 A1 | 9/2006 | Kirschner | |
| 2006/0236871 A1 | 10/2006 | Ternite et al. | 99/295 |
| 2007/0079708 A1 | 4/2007 | Li | 99/279 |
| 2007/0248734 A1 | 10/2007 | Denisart et al. | |
| 2007/0289453 A1 | 12/2007 | Halliday | |
| 2008/0014860 A1 | 1/2008 | Heitman et al. | |
| 2008/0038414 A1 | 2/2008 | Veciana I Membradeo et al. | |
| 2008/0122286 A1 | 5/2008 | Brock et al. | |
| 2008/0187638 A1 | 8/2008 | Hansen | |
| 2009/0032454 A1 | 2/2009 | Rapparini | 210/337 |
| 2009/0050540 A1 | 2/2009 | Imai et al. | |
| 2009/0136639 A1 | 5/2009 | Doglioni Majer | 426/431 |
| 2009/0155422 A1 | 6/2009 | Ozanne | 426/89 |
| 2009/0218877 A1 | 9/2009 | Derman | |
| 2010/0024658 A1 | 2/2010 | Jacobs et al. | |
| 2010/0064899 A1 | 3/2010 | Aardenburg | 99/295 |
| 2010/0173056 A1 | 7/2010 | Yoakim et al. | 426/433 |
| 2010/0176004 A1 | 7/2010 | Schneider et al. | 205/687 |
| 2010/0178392 A1 | 7/2010 | Yoakim et al. | 426/80 |
| 2010/0178404 A1 | 7/2010 | Yoakim et al. | 426/431 |
| 2010/0186599 A1 | 7/2010 | Yoakim et al. | 99/295 |
| 2010/0203198 A1 | 8/2010 | Yoakim et al. | 426/80 |
| 2010/0203208 A1 | 8/2010 | Yoakim et al. | 426/431 |
| 2010/0239734 A1 | 9/2010 | Yoakim et al. | 426/433 |
| 2011/0041702 A1 | 2/2011 | Yoakim et al. | 99/302 R |
| 2011/0052761 A1 | 3/2011 | Yoakim et al. | 426/77 |
| 2011/0189362 A1 | 8/2011 | Denisart et al. | 426/433 |
| 2011/0217421 A1 | 9/2011 | Perentes et al. | 426/80 |
| 2011/0244099 A1 | 10/2011 | Perentes et al. | 426/431 |
| 2011/0262601 A1 | 10/2011 | Manser et al. | |
| 2012/0058226 A1 | 3/2012 | Winkler et al. | |

FOREIGN PATENT DOCUMENTS

| | | |
|---|---|---|
| CN | 101001555 | 10/1987 |
| DE | 2151920 A1 | 4/1973 |
| DE | 32 41 606 A1 | 3/1984 |
| DE | 35 29 053 A1 | 2/1987 |
| DE | 35 29 204 A1 | 2/1987 |
| DE | 37 19 962 C1 | 6/1988 |
| DE | 42 40 429 A1 | 6/1994 |
| DE | 44 39 252 A1 | 5/1996 |
| DE | 10355671 A1 | 6/2004 |
| DE | 10 2005 007 852 A1 | 8/2006 |
| EP | 0521510 | 2/1975 |
| EP | 0242556 A1 | 10/1987 |
| EP | 0 250 810 A1 | 1/1988 |
| EP | 0 367 600 A1 | 5/1990 |
| EP | 0 512 470 A1 | 11/1992 |
| EP | 0521187 A1 | 1/1993 |
| EP | 0 607 759 A1 | 7/1994 |
| EP | 0 651 963 A1 | 5/1995 |
| EP | 0 749 713 A1 | 12/1996 |
| EP | 0 806 373 A1 | 11/1997 |
| EP | 1 208 782 A1 | 5/2002 |
| EP | 1 299 022 B1 | 4/2003 |
| EP | 1 654 966 A1 | 5/2006 |
| EP | 1 774 878 A1 | 4/2007 |
| EP | 1 813 333 A2 | 8/2007 |
| EP | 2 000 062 A1 | 12/2008 |
| EP | 2155021 B1 | 3/2011 |
| FR | 2 132 310 A1 | 11/1972 |
| FR | 2 487 661 A1 | 2/1982 |
| FR | 2 513 106 A1 | 3/1983 |
| FR | 2 531 849 A1 | 2/1984 |
| FR | 2 535 597 A1 | 5/1984 |
| FR | 2617389 | 11/1987 |
| FR | 2 624 364 A1 | 6/1989 |
| FR | 2 685 186 A1 | 6/1993 |
| FR | 2 686 007 A1 | 7/1993 |
| FR | 2 726 988 A1 | 5/1996 |
| GB | 1 506 074 A | 4/1978 |
| GB | 2 227 405 A | 8/1990 |
| GB | 2 253 336 A | 9/1992 |
| GB | 2 416 480 A | 2/2006 |
| JP | 50016225 A | 2/1975 |
| JP | 62254719 A | 11/1987 |
| JP | 63034581 U | 3/1988 |
| JP | 02124111 A2 | 5/1990 |
| JP | 02189114 A2 | 7/1990 |
| JP | 06339431 A2 | 12/1994 |
| JP | 3034606 | 2/1997 |
| JP | 2001061663 A2 | 3/2001 |
| JP | 2002189115 A | 7/2002 |
| JP | 2002215414 A | 8/2002 |
| JP | 2003144973 A2 | 5/2003 |
| JP | 2004517654 A | 6/2004 |
| JP | 2005516602 | 6/2005 |
| JP | 2005199071 A2 | 7/2005 |
| JP | 2005525146 A | 8/2005 |
| JP | 2006515764 A | 6/2006 |

(56) References Cited

FOREIGN PATENT DOCUMENTS

| | | |
|---|---|---|
| JP | 2006518226 A | 8/2006 |
| JP | 2008508041 A | 3/2008 |
| JP | 2008520298 A | 6/2008 |
| TW | 200718383 | 5/2007 |
| WO | WO 94/02059 A1 | 2/1994 |
| WO | WO 02/17760 A1 | 3/2002 |
| WO | WO 02/35977 A1 | 5/2002 |
| WO | WO2004/030500 A1 | 4/2004 |
| WO | WO2005/066040 A2 | 7/2005 |
| WO | WO 2006/082064 A1 | 8/2006 |
| WO | WO 2006/112691 A1 | 10/2006 |
| WO | WO2007/014564 A1 | 2/2007 |
| WO | WO 2007/041954 A1 | 4/2007 |
| WO | WO 2007/042414 A1 | 4/2007 |
| WO | WO 2007/085921 A2 | 8/2007 |
| WO | WO 2007/110768 A2 | 10/2007 |
| WO | WO 2008/087099 A2 | 7/2008 |
| WO | WO 2008/148601 A1 | 12/2008 |
| WO | WO 2008/148604 A1 | 12/2008 |
| WO | WO 2008/148646 A1 | 12/2008 |
| WO | WO 2008/148650 A1 | 12/2008 |
| WO | WO 2008/148656 A1 | 12/2008 |
| WO | WO 2008/148834 A1 | 12/2008 |
| WO | WO 2009/050540 A1 | 4/2009 |
| WO | WO 2009/106175 A1 | 9/2009 |
| WO | WO 2009/106598 A1 | 9/2009 |
| WO | WO 2009/133134 A1 | 11/2009 |
| WO | WO 2010/026045 A1 | 3/2010 |
| WO | WO 2010/026053 A1 | 3/2010 |
| WO | WO 2010/038213 A2 | 4/2010 |
| WO | WO 2010/041179 A2 | 4/2010 |

OTHER PUBLICATIONS

Chilean Patent Application No. CL-1652-2008, filed Jun. 5, 2008 (English in U.S. equivalent 2010/0173056 and WO2008/148601).
Chilean Patent Application No. CL-1653-2008, filed Jun. 5, 2008 (English in U.S. equivalent 2010/0186599 and WO2008/148604).
Chilean Patent Application No. CL-1655-2008, filed Jun. 5, 2008 (English in U.S. equivalent 2010/0178404 and WO2008/148646).
U.S. Appl. No. 13/061,567, filed Mar. 1, 2011.
Non Final Office Action, U.S. Appl. No. 12/602,577, dated Mar. 20, 2012.
Non Final Office Action, U.S. Appl. No. 12/602,562, dated Feb. 13, 2012.
Final Office Action, U.S. Appl. No. 12/602,562, dated Jun. 22, 2012.
Non Final Office Action, U.S. Appl. No. 12/602,542, dated Apr. 13, 2012.
Non Final Office Action, U.S. Appl. No. 12/602,730, dated May 17, 2012.
Non Final Office Action, U.S. Appl. No. 12/860,705, dated Mar. 16, 2012.
Restriction Requirement, U.S. Appl. No. 12/602,553 dated May 11, 2012.
Non Final Office Action, U.S. Appl. No. 12/602,568, dated Mar. 20, 2012.
Green Mountain Coffee, New K-Cup Samplers Offer More Variety; Jul. 11, 2008, pp. 1-5. Accessed Mar. 6, 2012 from http://www.greenmountincafe.com/2008/07/new-k-cup-samplers-offer-more-variety/.
Non Final Office Action, U.S. Appl. No. 12/776,155, dated Jul. 18, 2012.
Final Office Action, U.S. Appl. No. 12/602,568, dated Jul. 16, 2012.
Final Office Action, U.S. Appl. No. 12/602,562, dated Jun. 22, 2012.
Final Office Action, U.S. Appl. No. 12/602,577, dated Jul. 20, 2012.
Final Office Action, U.S. Appl. No. 12/860,705, dated Jul. 18, 2012.
International Search Report mailed Feb. 9, 2010, Application No. PCT/EP2009/060697 filed Aug. 19, 2009.
International Search Report mailed Feb. 8, 2010, Application No. PCT/EP2009/060771 filed Aug. 20, 2009.
International Search Report and Written Opinion mailed Sep. 11, 2008, Application No. PCT/EP2008/054401 filed Apr. 11, 2008.
International Search Report and Written Opinion mailed Oct. 24, 2008, Application No. PCT/EP2008/054810 filed Apr. 21, 2008.
International Search Report and Written Opinion mailed Oct. 8, 2008, Application No. PCT/EP2008/056310 filed May 22, 2008.
International Search Report and Written Opinion mailed Oct. 1, 2008, Application No. PCT/EP2008/056345 filed May 23, 2008.
International Search Report and Written Opinion mailed Sep. 11, 2008, Application No. PCT/EP2008/056412 filed May 26, 2008.
International Search Report and Written Opinion mailed Oct. 7, 2008, Application No. PCT/EP2008/056968 filed Jun. 5, 2008.
European Search Report dated Apr. 9, 2010, Application No. EP 09174573.
U.S. Appl. No. 12/602,542, filed Dec. 1, 2009.
U.S. Appl. No. 12/602,568, filed Dec. 1, 2009.
U.S. Appl. No. 12/602,562, filed Dec. 1, 2009.
U.S. Appl. No. 12/602,553, filed Dec. 1, 2009.
U.S. Appl. No. 12/602,577, filed Dec. 1, 2009.
U.S. Appl. No. 12/602,730, filed Dec. 2, 2009.
U.S. Appl. No. 12/776,155, filed May 7, 2010.
U.S. Appl. No. 12/856,369, filed Aug. 13, 2010.
U.S. Appl. No. 12/860,705, filed Aug. 20, 2010.
Final Office Action, U.S. Appl. No. 12/602,542, dated Oct. 4, 2012.
Final Office Action, U.S. Appl. No. 12/602,730, dated Sep. 18, 2012.
Non Final Office Action, U.S. Appl. No. 12/602,553, dated Aug. 23, 2012.
Non Final Office Action, U.S. Appl. No. 12/602,568, dated July Oct. 19, 2012.
Non Final Office Action, U.S. Appl. No. 13/133,613, dated Jul. 18, 2013.
Non Final Office Action, U.S. Appl. No. 12/856,369, dated Jul. 30, 2013.
Non-Final Office Action, U.S. Appl. No. 12/602,577 dated Nov. 1, 2013.
Non-Final Office Action, U.S. Appl. No. 12/602,730 dated Dec. 17, 2013.
Advisory Action, U.S. Appl. No. 12/602,730 dated Jan. 18, 2013.
Restriction Requirement, U.S. Appl. No. 13/133,613 dated Mar. 28, 2013.
Restriction Requirement, U.S. Appl. No. 12/856,369 dated Feb. 15, 2013.
Notice of Allowance, U.S. Appl. No. 12/776,155 dated Mar. 1, 2013.
Notice of Allowance, U.S. Appl. No. 12/602,568 dated Feb. 1, 2013.
Final Office Action, U.S. Appl. No. 13/061,558 dated May 21, 2013.
Final Office Action U.S. Appl. No. 12/602,553 dated Apr. 11, 2013.
Non-Final Office Action, U.S. Appl. No. 13/602,542 dated Jun. 18, 2013.
Notice of Allowance, U.S. Appl. No. 13/061,567 dated Jun. 11, 2013.
Non-Final Office Action, U.S. Appl. No. 13/061,567 dated May 10, 2013.
Advisory Action, U.S. Appl. No. 12/602,577 dated Oct. 11, 2012.
U.S. Appl. No. 12/602,542, Final Office Action, dated Jan. 30, 2014.
U.S. Appl. No. 12/602,577, Final Office Action, dated May 16, 2014.
U.S. Appl. No. 12/602,562, Non-Final Office Action, dated Jul. 17, 2014.
U.S. Appl. No. 13/133,613, Final Office Action, dated Mar. 21, 2014.
U.S. Appl. No. 12/602,553, Final Office Action, dated May 8, 2014.

* cited by examiner

METHOD FOR PREPARING A FOOD LIQUID CONTAINED IN A CAPSULE BY CENTRIFUGATION AND SYSTEM ADAPTED FOR SUCH METHOD

This application is a 371 filing of International Patent Application PCT/EP2009/060697 filed Aug. 19, 2009.

BACKGROUND

The present invention relates to a device and capsule system for preparing a food liquid from a food substance contained in a receptacle by passing water through the substance using centrifugal forces.

It is known to prepare beverages wherein a mixture consisting of brewed coffee and coffee powder is separated with centrifugal forces. Such a mixture is obtained by bringing hot water and coffee powder together for a defined time. The water is then forced through a screen, on which screen powder material is present.

Existing systems consist of placing the coffee powder in a receptacle which is usually a non-removable part of a machine such as in EP 0367 600B1. Such devices have many disadvantages. Firstly, the coffee powder must be properly dosed manually in the receptacle. Secondly, the centrifuged coffee waste becomes dry and it must be removed by scraping the surface of the receptacle. As a result, the coffee preparation requires a lot of manual handling and is so very time consuming. Usually coffee freshness can also vary a lot and this can impact on the cup quality because coffee comes generally from bulk package or coffee is ground from beans in the receptacle itself.

Also, depending on the manual dosage of coffee and the brewing conditions (e.g., centrifugal speed, receptacle size) the cup quality can vary a lot.

Therefore, these systems have never reached an important commercial success.

In German patent application DE 102005007852, the machine comprises a removable holder into which an open cup-shaped part of the receptacle is placed; the other part or lid being attached to a driving axis of the machine. However, a disadvantage is the intensive manual handling. Another disadvantage is the difficulty to control quality of the coffee due to a lack of control for the dosing of the powder and a lack of control of the freshness of the coffee powder.

Other devices for brewing coffee by centrifuge forces are described in WO 2006/112691; FR2624364; EP0367600; GB2253336; FR2686007; EP0749713; DE4240429; EP0651963; FR2726988; DE4439252; EP0367600; FR2132310; FR2513106; FR2487661; DE3529053; FR2535597; WO2007/041954; DE3529204; DE3719962; FR2685186; DE3241606 and U.S. Pat. No. 4,545,296.

In particular, EP0651963 relates to a centrifugal cell comprising an elastic joint placed at the junction between the drum and the lid of the cell. The elastic joint provides both filtering and control of an operating pressure in the cell, thereby improving coffee cream. The cell is not an airtight container and used coffee must be removed and new coffee must be refilled in the cell for each new brewing cycle. The pressure is difficult to control by such elastic means and the pressure cannot be easily varied depending on the type of beverage to be produced.

BE894031 relates to a centrifugal brewing system comprising a filter capsule which is not sealed but is covered by filter paper.

Therefore, there is a need for proposing a solution which provides a better control of the extraction parameters (e.g., pressure, flow rate, extraction time, etc.) and, consequently, which improves the quality of the delivered food liquid.

At the same time, there is a need for a way of preparing a food liquid which is more convenient and simpler compared to the prior art centrifugal coffee preparation methods and which provides, at the same time, a better in-cup quality by controlling important attributes such as freshness and accurate dosage of the substance.

In particular, there is a need for a system which enables to provide a sufficient interaction time between hot water and the substance to be brewed and controlling the release of the brewed liquid, therefore improving important quality attributes such as, for coffee beverages, the coffee concentration and cream or foam.

SUMMARY OF THE INVENTION

Therefore, the invention relates to a liquid food preparation system for preparing a liquid food from a food substance comprising a preparation device and a capsule removably insertable in the device, by passing water through the substance in the capsule, comprising a water injection head in the capsule and a capsule holder for holding the capsule in the device, characterized in that it comprises:

a water injector, as part of the water injection head, arranged for introducing water in the capsule, means for driving the capsule holder in centrifugation around an axis of rotation and, wherein the opening means are configured to create at least one liquid delivery outlet in the capsule at least partially in response to the centrifugal forces of liquid which exert in the capsule.

Preferably, the device comprises at least one opening means for providing at least one liquid delivery outlet in the capsule which is placed in a position relatively offset to said central axis of the capsule holder. The opening means are preferably at the surface of the injection head.

Preferably, said opening means comprises a series of piercing elements distributed along a substantially circular path about the central axis. For example, the opening elements can form truncated pyramids, needles and/or blades.

More particularly, the water injecting head comprises a water injector and a rotary engaging member for engaging the capsule in closure onto the capsule holder. Preferably, the rotary engaging member applies a pressing force onto a peripheral edge of the capsule which itself is supported by the capsule holder. Therefore, the engaging member and the capsule holder rotate together while maintaining firmly the capsule in place in the capsule holder during centrifugation. The water injector can be non-moving or moving with the rotary engaging member.

In one mode, the opening means of the liquid delivery outlet(s) are piercing members, which can be part of the rotary engaging member of the water injection head.

Preferably, the piercing members can be distributed at regular intervals along a substantially circular path therefore providing a homogeneous liquid delivery at the periphery of the capsule. For instance, the number of piercing members can be of from 10 to 200, most preferably, between 50 and 100.

The piercing members can engage in the capsule and so also participate to transfer the rotational momentum to the capsule during rotation.

According to an aspect of the invention, the opening members are thus configured to provide the liquid delivery outlet(s) of the capsule when the internal pressure of the liquid against a peripheral wall of the capsule exceeds a threshold pressure as liquid is centrifuged in the capsule through the substance.

For this, the opening members can be elements which are distant or in contact with the capsule when the water injection head and capsule holder are closed about the capsule. Thus, as the pressure of liquid increases on the peripheral wall of the capsule, the outlet(s) are created by deformation of the wall, e.g., a lid membrane, of the capsule against the opening members. This configuration enables to delay the release of the beverage from the capsule. The outlets are thus fully created when a threshold of operating pressure has been attained at the peripheral wall of the capsule. As a result, the interaction between the ingredients in the capsule and water can be prolonged. Depending on the puncture resistance of the delivery wall of the capsule, the release of the beverage through the outlet(s) can be successfully controlled.

Concerning the capsule, the peripheral wall of the capsule can be a portion of a perforable membrane. For instance, the peripheral wall can be a peripheral portion of a membrane which is transversal to the axis of rotation of the capsule in the capsule holder. Preferably, the capsule has a sidewall which widens in direction of the peripheral portion of the perforable membrane. Therefore, the brewed liquid in the capsule is forced by the centrifuged forces to converge in the direction of the peripheral portion of the perforable membrane. In such case, the perforable membrane can be sealed on a flange-like rim of the cup-shaped body of the capsule. In an alternative, the piercing wall can be a portion of the sidewall of the cup-shaped body of the capsule.

The capsule may comprise a perforable membrane made of an aluminium and/or a polymer material. In particular, the puncturable membrane can have a thickness between 5 and 150 microns, preferably 10 and 100 microns. The thickness of the membrane can be designed in such a way that opening can be predicted at a defined operating pressure and/or after a defined centrifugation time. Thus, the thickness of the membrane may vary according the substance in the capsule and/or the beverage to be delivered.

In a mode, during the closure of the device about the capsule, a preweakening of the peripheral wall of the capsule can be created by the opening members being in contact with the wall, e.g., during relative engagement of the device on the capsule before the centrifugation operation. A preweakening of the wall can be a multitude of through-holes of smaller section than the final punctured outlets or can be a material weakening by reduction of the thickness of the wall. The peripheral wall of the capsule can be sufficiently elastic to deform and elongate without immediately breaking against the piercing members. Consequently, it provides a certain delay of the release of the beverage until a sufficient passage of the outlet is created for liquid to flow there through.

The shape of the piercing members for the outlets is also important to properly control the piercing of the outlets in the capsule. Blunt piercing shapes will provide a longer resistance of the capsule to piercing and thus a longer delay of the release of the liquid beverage. On the contrary, sharper piercing shapes will provide a quicker delivery and therefore a shorter residence time of the liquid in the capsule.

The residence time of liquid in the capsule also depends on the centrifugal speed since the higher the speed, the higher the pressure and potentially, the quicker the centrifuged liquid passes through the ingredients in the capsule and is so released out of the capsule.

In a possible aspect of the invention, the water injector also comprises an opening means such as a piercing member. The opening means can be a piercing member arranged as a hollow piercing tube for injecting water in the capsule, preferably along the central axis of rotation of the capsule, so that the tube can be maintained in a static position. It can be noted that the piercing member could also be rotating with the engaging member of the injection head.

The piercing member of the water injector has a diameter of less than 5 mm, preferably, between 0.9 and 2.9 mm. Indeed, the pressure in the capsule increases from the centre to the periphery. The pressure of water in the centre can be close to zero but gradually increases outwardly. Therefore, a small diameter of the injector provides a small inlet in the capsule to so maintain a relatively low liquid pressure at the inlet side of the capsule and consequently, reduce the overflow of liquid through the pierced inlet. Another advantage is also that a liquid sealing means might not be necessary around the inlet side and the capsule can vent properly as liquid replaces gas in the capsule.

The driving means of the capsule holder can be directly connected to the capsule holder or indirectly connected to the capsule holder. A direct connection to the capsule holder can be obtained by a rotational drive assembly comprising a rotary motor and a drive transmission connecting the motor to the bottom of the capsule holder. The drive transmission may comprise a suitable gear reduction or amplification to provide the correct transmission rate to the capsule holder in function of the motor speed. An indirect connection to the capsule holder can be obtained by transmission of the rotational momentum from the water injection head to the capsule holder via the capsule and/or directly. In this case, the drive transmission of the rotational drive assembly is connected directly to the upper side of the water injection head, in particular to the rotary engaging member of the head.

The device of the invention may receive capsules made of rigid, semi-rigid and/or soft materials. The capsule may be made of materials such as plastics, aluminium, cellulose-based materials or other biodegradable materials, and combinations therefore. Preferably, the capsule has a closing pierceable wall, e.g., a thin membrane, which comprises at least an annular portion intended to be pierced which is peripheral relative to the axis of rotation of the capsule when the capsule is in position in the device. The wall can form a sealing membrane covering a cup-shaped body which receives the food substance to be brewed. The capsule can be formed of a body which is more rigid than the membrane to be pierced. The capsule is preferably closed in a gastight manner. Its internal volume which is not occupied by the substance can advantageously be filled with a protective gas (e.g., nitrogen). The capsule has layers of materials having gas barrier properties such as aluminium or EVOH layers.

In a mode, the system can comprise a valve means which is arranged downstream of the opening means of the at least one liquid delivery outlet. The valve enables to control the pressure inside the capsule by opening at a defined threshold of pressure of liquid which exerts on it. The valve means may comprise an annular closure ring and an elastic means for elastically engaging the ring in closure onto a peripheral part, e.g., an edge, of the capsule. The valve can be designed to provide an adjustable value of its closure load. A valve means can be useful to control the pressure in the capsule and hence the release of the centrifuged liquid from the capsule. In particular, the valve means can also prevent the accumulation of small particles (e.g., coffee fines) at the outlets of the capsule and consequently avoid blockage or, at least, avoid a significant reduction of the flow. It is also noticed that the valve provides more cream or foam in the liquid. In particular, the higher the load of the valve, the more cream or foam is created.

The invention also relates to a method for preparing a food liquid from a food substance contained in a single-use capsule by passing water through the substance comprising:
driving the capsule in centrifugal rotation while introducing water in the capsule,
passing water through the substance to form a food liquid, piercing at least one liquid delivery outlet in the capsule, wherein piercing is obtained, at least partially, by the effect of the centrifugal forces of liquid which exert in the capsule as a result of the centrifugation.

The capsule can be a gas-tightly sealed capsule comprising ingredients such as ground coffee, instant coffee, leaf tea, instant tea, cocoa, chocolate, a creamer, sweetener, and any combinations thereof which can be preserved in protected atmosphere conditions for an extended period of time. The capsule is thus opened at the time of use in the device.

According to an aspect of the method, at least one liquid delivery outlet is obtained by piercing at least a peripheral portion of the capsule. In particular, piercing of the capsule is carried out by outward deformation of the peripheral portion of the capsule against piercing elements. The piercing elements can be part of the device of the invention. More particularly, the peripheral portion is part of a sealing membrane of the capsule. The membrane can be formed of thin plastic and/or aluminium material.

In the preferred mode of the invention, the at least one outlet opening is carried out at least partially, when the peripheral portion of the capsule deforms outwardly as a result of the internal pressure of the centrifuged liquid at the peripheral portion of the capsule. The at least one liquid delivery outlet can thus be obtained by piercing a peripheral portion of the membrane of the capsule. More preferably, several outlet openings are opened in a peripheral portion of the membrane of the capsule. Thus, the portion of the membrane can pierce against a series of puncture elements such as needles, pyramids and/or blades. The liquid can also be forced in direction of the peripheral portion by a sidewall of the capsule which widens in direction of the peripheral portion of the perforable membrane.

In a possible mode, the series of puncture elements are distributed along a substantially circular path to thus form a puncturing crown protruding at the periphery of the injection head. The puncturing crown is placed in such a manner that it engages a peripheral area of the perforable membrane. More particularly, the puncturing crown is part of the rotary engaging member of the head. The crown can be an integral part of the member, for example can be moulded in one single piece with the member.

The capsule can be maintained during centrifugation by its peripheral edge being pinched by closure of the injection head and the capsule holder about the capsule. During closure of the device about the capsule, the piercing elements may come in contact with the sealing membrane or may be slightly distant from the sealing membrane. The contact with the sealing membrane may, for instance, create a preweakening, e.g., imprints or small perforations, of the sealing membrane. As liquid is centrifuged in the capsule, a pressure of liquid is exerted at the periphery of the inner surface of the sealing membrane which thus blows or deforms in the direction of the piercing elements and so pierces against the piercing elements, e.g., against the puncture crown. Of course, a preweakening of the perforable membrane can be avoided by the piercing element coming just in contact with the membrane or being maintained at controlled distance before the capsule is centrifuged in the device.

The sealing membrane may be flexible or slightly rigid depending on the materials. The membrane may have a concave shape at its initial rest position and may deform to form a convex shape in response to the centrifugal pressure. In such case, the material may be, for instance, made of thermoformed or injected plastics. Preferably, the membrane is thin and flexible to snugly deform against the piercing elements. There might be no longer a need for a filter in the system since the solid particles of substance can be prevented from leaving the capsule at the interface between the edges of the pierced outlets and the surface of the piercing elements. One advantage is that the structure of the capsule can be greatly simplified with fewer pieces (no filter is necessary in the capsule) and the production costs can be significantly lowered.

According to a possible aspect of the method of the invention, water is introduced in the capsule through an opening of less than 5 mm, preferably between 0.9 and 2.9 mm. As aforementioned, a sufficiently small water inlet is preferred in the capsule in order to reduce the internal pressure of liquid at the inlet side of the capsule and therefore avoid liquid leakage problems.

Preferably, water is introduced in the centre of the capsule after having pierced a water inlet in the centre of the capsule.

In a particular mode, the liquid delivered from the capsule opens a valve when a certain pressure of the released liquid is exerted on the valve by the centrifuged liquid. The valve also regulates the flow of liquid and it reduces the risk of blocking the small outlets provided in the capsule by small size particles, e.g., coffee fines, in particular, at relatively low pressure values.

The valve can preferably be composed of at least a part of the device. The valve means can be formed by at least one engaging portion of the device which moves relatively to an engaging portion of the capsule or device under the effect of the pressurized liquid for making a thin annular laminating passage for the liquid. The laminating passage also enables to create a liquid jet of relatively high velocity that impacts on a wall of the device. As a result, a relatively high amount of foam can be created both due to the restriction that is created by the valve means and by the impact of the liquid on the impact surface of the device at a relatively high velocity during centrifugation. Depending on the amount of pressure exerted on the valve means by the centrifuged liquid, the restriction caused by the valve means can differ in amplitude. In a possible mode, the valve means can be calibrated or adjusted to selectively open a liquid passage through the device at a threshold of pressure in the capsule.

As a result, the system of the invention provides a solution for preparing a food liquid wherein a controlled release of the food liquid can be carried out. For example, the release of liquid can be delayed until a certain pressure is exerted on a peripheral portion of the capsule which then pierces against external protruding elements of the device. A delayed opening of the capsule enables to improve the interaction between water and the substance contained in the capsule and a filtering of the liquid can also be obtained by the restrictions created between the piercing outlets and the piercing elements of the device. In this case, the capsule can be of a very simple construction and can be discarded after use, e.g., for destruction or recycling.

For coffee, for example, it may be advantageous to optimize interaction of water and the ground coffee particles to obtain a good extraction of the coffee and aroma compounds. Moreover, the foam or coffee cream can be improved due to the pressure release and the shear stress created through the restrictions forming in a dynamic manner between the outlets of the capsule and the piercing elements during the centrifugal operation.

The liquid delivered from the capsule can also be filtered by dedicated filtering means provided in the capsule. Such a configuration has advantages because the device is simplified, the filter does not require cleaning since it is discarded after one single use with the capsule.

The invention also relates to the device itself as defined in the present application.

The term "food liquid" has here a broad meaning and encompasses: a culinary liquid such as soup or sauce, a beverage liquid such as coffee extract (obtained from ground and/or instant coffee powder), liquid chocolate, milk (obtained from powder and/or liquid concentrate), tea extract (obtained from instant and/or leaf), etc., or a nutritional liquid such as an infant formula and combinations thereof.

The terms "brewing" or "brewed" is not to be taken in the narrow sense of extracting under pressure a liquid from a non-entirely soluble substance (such as ground coffee or leaf tea) but is to be taken in a broader sense as encompassing the interaction processes of a food substance and a liquid, preferably water, including the processes of extraction, infusion, adsorption, dissolution, dilution, dispersion, mixing, emulsifying, foaming and the like.

The term "piercing" is to be taken in its broad sense and it includes the mechanical processing such as piercing, cutting, breaking and/or tearing for providing a through-opening in a wall of the capsule.

BRIEF DESCRIPTION OF THE DRAWINGS

Additional features of the invention will appear in the detailed description of the figures which follows.

DETAILED DESCRIPTION OF THE INVENTION

Figure 1:
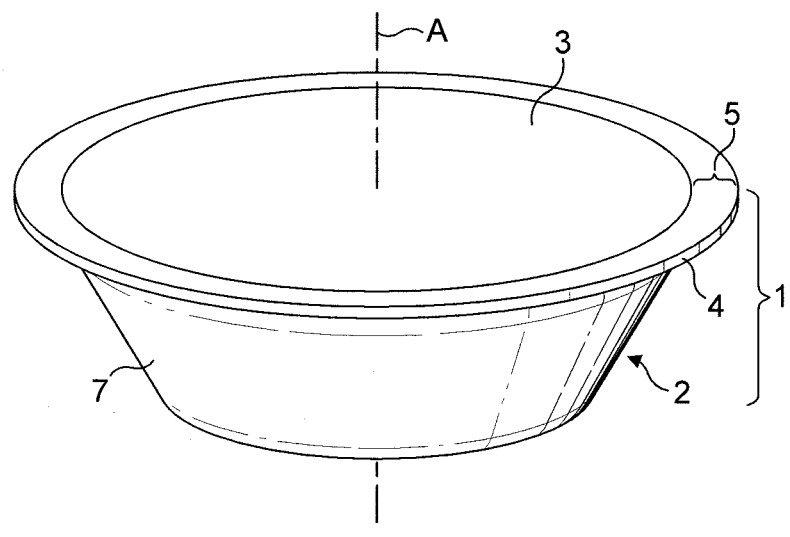
FIG. 1 is a top perspective view of the sealed capsule of the system according to the invention.
Figure 2:
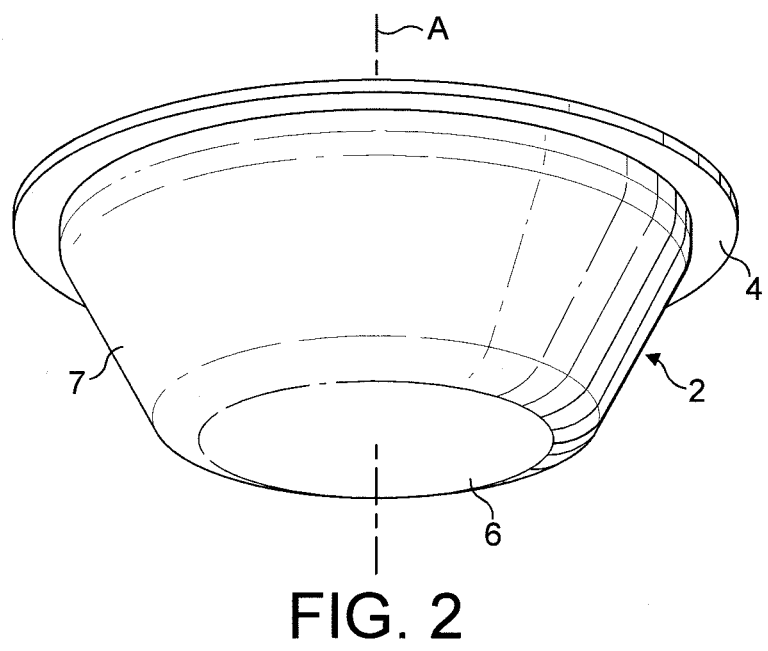
FIG. 2 is a bottom perspective view of the capsule of FIG. 1.
Figure 3:
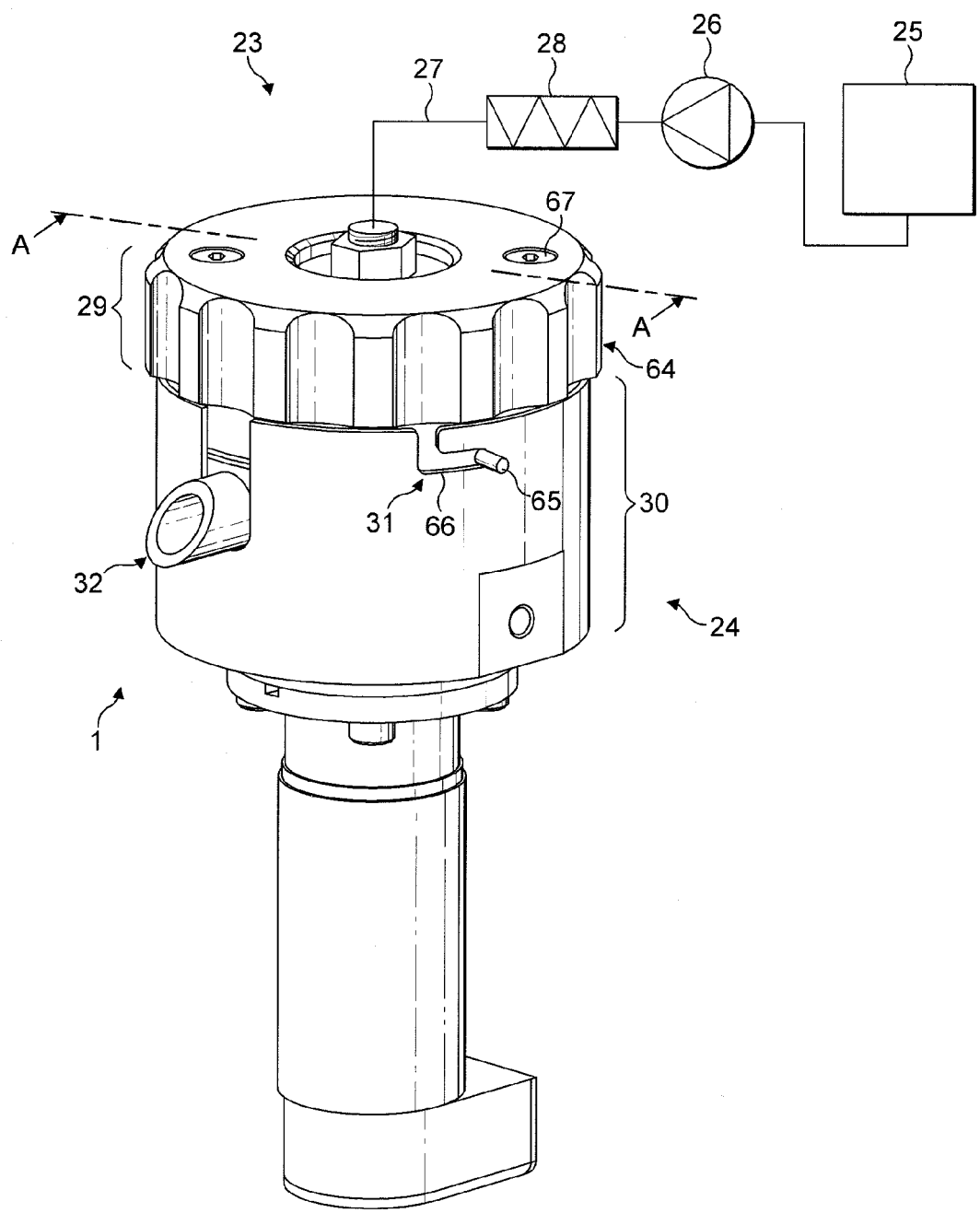
FIG. 3 is a perspective view of the beverage production device of the invention.

As shown in FIGS. 1 and 2, a preferred single-use capsule 1 of the invention generally comprises a dished body 2 onto which is sealed a sealing foil or membrane 3. The sealing foil 3 is sealed onto a peripheral rim 4 of the body at a sealing annular portion 5. The rim 4 can extend outwards forming an annular sealing small portion of about 2-5 mm. The dished body comprises a bottom wall 6 and a side wall 7 which preferably widens in direction of the large open end of the body opposed to the bottom wall. The dished body is preferably rigid or semi-rigid. It can be formed of a food grade plastics, e.g., polypropylene, with a gas barrier layer such as EVOH and the like or aluminium alloy or a complex of plastic and aluminium alloy. The sealing foil 3 can be made of a thinner material such as a plastic laminate also including a barrier layer or aluminium alloy or a combination of plastic and aluminium alloy. The sealing foil is usually of a thickness between 50 and 250 microns, for example. The sealing foil member can be pierced for creating the water inlet and the beverage outlet(s) as will be described later in the description.

Preferably, the capsule forms a symmetry of revolution around a central axis A. However, it should be noted that the capsule may not necessarily have a circular section around axis A but may take another form such as a square, a rectangle, or another polygonal form.

The system including a capsule of the invention and a beverage preparation device is illustrated in FIGS. 3 to 7 and is described now.

The system comprises a capsule 1 as aforementioned and a beverage preparation device 23. The device has a module 24 into which a capsule can be inserted. The capsule contains a food substance for being brewed and the capsule is removed from the module after use for being discarded (e.g., for waste or recycling of the organic and inorganic raw materials). The module 24 is in fluid communication with a water supply such as a water reservoir 25. A fluid transport means such as a pump 26 is provided in the fluid circuit 27 between the module and the water supply. A water heater 28 is further provided to heat water in the fluid circuit before water enters the module. The water heater can be inserted in the fluid circuit to heat fresh water coming from the reservoir. Alternatively, the water heater can be placed in the water reservoir itself that becomes a water boiler in such case. Of course, water can also be taken directly from a domestic water supply via a water plug connection. The device may further comprise control means and activation means for activating the beverage preparation method (not illustrated).

Water can be fed in the module 24 at low pressure or even at gravity pressure. For example, a pressure of between 0 and 2 bar above atmospheric pressure can be envisaged at the water inlet of the module. Water at higher pressure than 2 bar could also be delivered if a pressure pump is utilized such as a piston pump.

The brewing module 24 can comprise two main capsule encasing sub-assemblies 29, 30; mainly comprising a water injection sub-assembly or water injection head and a liquid receiving subassembly including a capsule holder. The two subassemblies form positioning and centering means for the capsule in the device.

Figure 4:
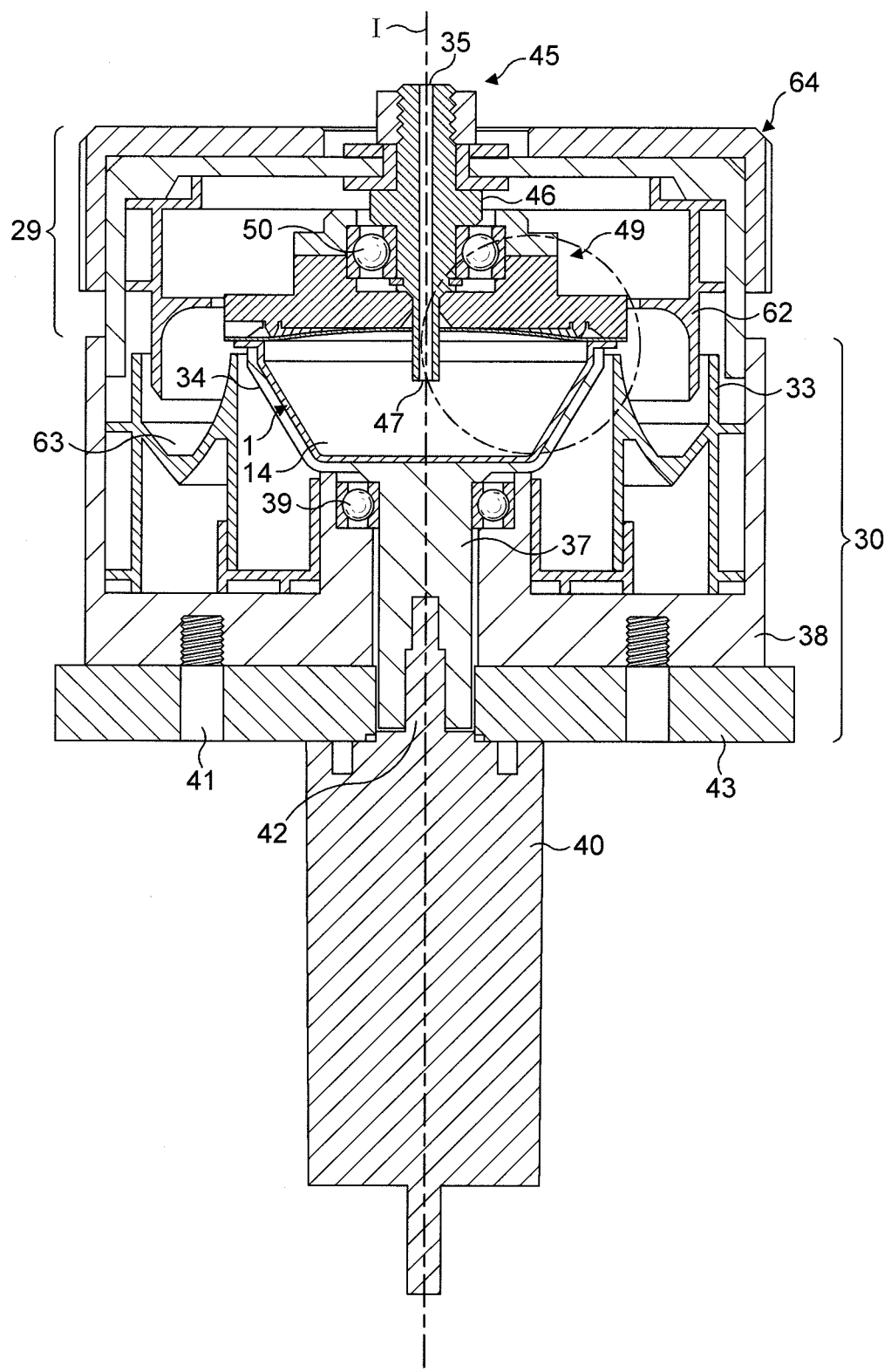
FIG. 4 is a cross sectional view of a beverage production device with a capsule inside.
Figure 5:
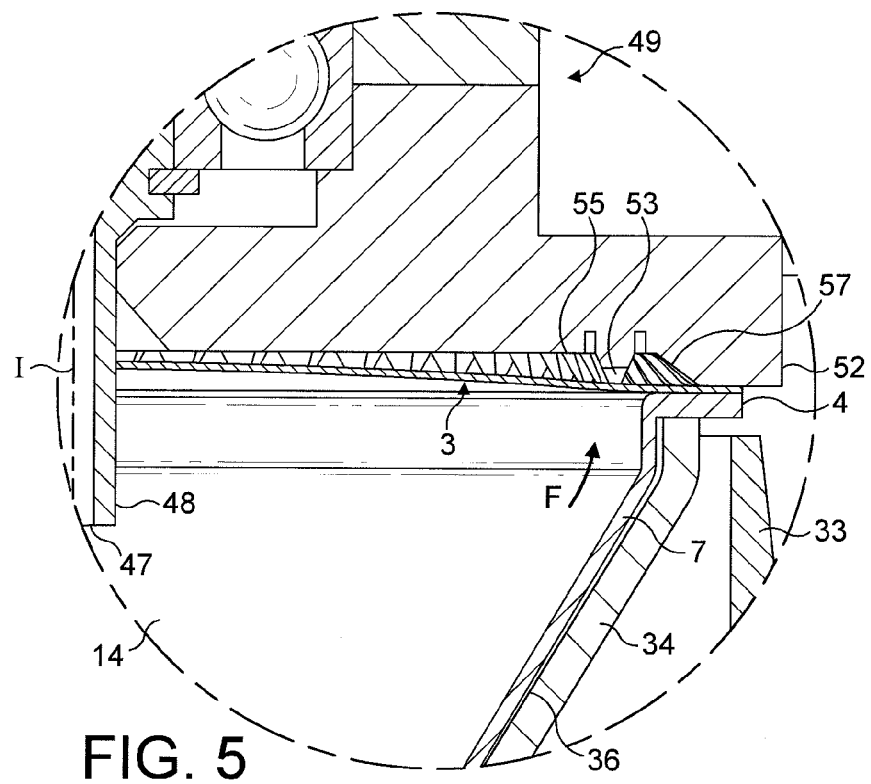
FIG. 5 is a detailed cross sectional view of the device with a capsule inside before opening of the capsule by the device.

The two subassemblies' closes together to encase a capsule therein for example by a bayonet-type connection system 31. The liquid receiving subassembly 30 comprises a liquid duct 32, for example, protruding on a side of the subassembly for guiding the centrifuged liquid coming out of the capsule to a service receptacle such as a cup or glass. The liquid duct is in communication with a liquid receiver 33 forming a U- or V-shaped annular section surrounding a capsule holder formed by a rotating drum 34 into which the capsule is inserted as illustrated in FIG. 4. The liquid receiver 33 defines a collecting cavity 63 for collecting the liquid as will be explained later in the description. Below the liquid receiving subassembly 30, are placed means for driving the capsule receiving drum 34 in rotation inside the subassembly.

The driving means comprise preferably a rotary motor 40 which can be supplied by electricity or gas power.

The water injection subassembly comprises a water inlet side comprising a water inlet 35 communicating upstream with the water fluid circuit 27.

The rotary drum 34 is shaped as a hollow capsule holder with an internal cavity 36 complementary shaped to receive the capsule. The rotary drum 34 prolongs itself axially by a rotating shaft 37 which is maintained in rotational relationship relative to an outer base 38 of the liquid receiver 33 by a rotational guiding means 39 like a ball bearing or needle bearing. Therefore, the rotary drum is designed to rotate around a median axis I whereas the outer base 38 of the receiver is fixed relative to the device. A mechanical coupling can be placed at the interface between the rotating shaft 37 of the drum and the shaft 42 of the motor 40.

Considering the water injection subassembly 29, it comprises a centrally arranged water injector 45 which is fixed relative to longitudinal axis I of the device. The water injector comprises a central tubular member 46 for transporting water from the inlet 35 to a water outlet 47 that is intended to protrude inside the enclosure 14 of the capsule. The water outlet is formed of a puncturing means 48 such as a sharp tubular tip that is able to create a puncture hole through the closing foil of the capsule.

About the water injector is mounted a rotary engaging part 49. The engaging part 49 has a central bore for receiving the water injector and rotational guiding means such as a ball or needle bearing 50 inserted between the part 49 and the injector 45.

The capsule engaging subassembly 29 may further comprise a tubular portion of skirt 62 which protrudes in the internal annular chamber 63 of the liquid receiving subassembly 30 when the two subassemblies are closed relatively one another about a capsule. This tubular portion of skirt 62 forms an impact wall for the centrifuged liquid which exits the centrifuged capsule. This portion 62 is preferably fixed on the subassembly 29. The subassembly further comprises a handling portion 64 for facilitating the connection on the liquid receiving subassembly 30. This handling portion 64 can have a knurled peripheral surface for handling. The handling portion can be fixed on the fixed base of the subassembly 29 by screws 67.

This portion could of course be replaced by a lever mechanism or a similar handling means.

According to an important aspect of the invention, the rotary engaging part comprises piercing elements 53 located at the periphery of the part. More particularly, the piercing elements are formed of small elements protruding from the lower surface of the engaging part. The piercing elements are preferably distributed along a circular path thus forming a puncturing crown at the surface of the engaging part.

Figure 6:
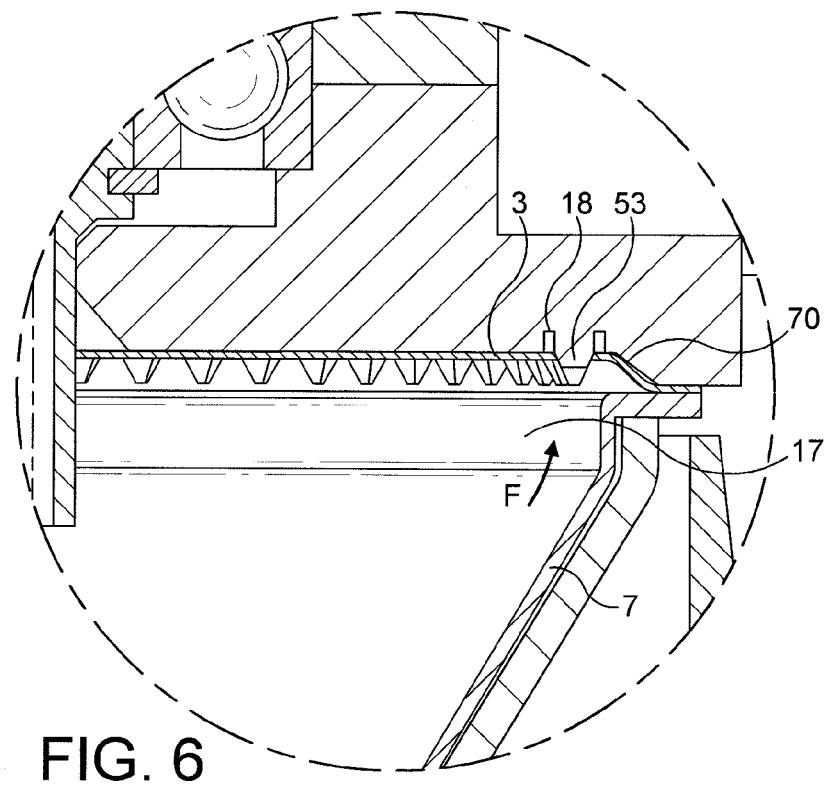
FIG. 6 is a detailed cross sectional view of the device with a capsule inside after piercing of the capsule.

In a preferred mode, the piercing elements are solid (i.e., non-hollow) elements having a larger base and narrowing tip. For instance, the elements are small truncated pyramids. When a sufficient amount of pressure of liquid builds at the periphery of the membrane as illustrated in FIG. 6, the membrane 3 deforms outwardly in direction of the piercing elements 53. Due to the widening shape of the sidewall 7 of the capsule, the liquid is forced to rise up (Direction F) through the substance in the capsule and to press on the peripheral portion of the membrane 3 thus causing the membrane to pierce against the elements 53. The element being solid ones, outlets are formed by the small interstices comprised between the edge of the pierced holes in the membrane and the surface of the piercing elements fitting in the holes. Therefore, filtering of the liquid can be carried out between the elements and the membrane. A specific filter in the capsule might not be necessary.

Therefore, the piercing members are arranged at the periphery of the wall 55, preferably evenly distributed to provide several outlet openings in the capsule for the centrifuged liquid to leave the capsule forming several streams of liquid.

Figure 7:
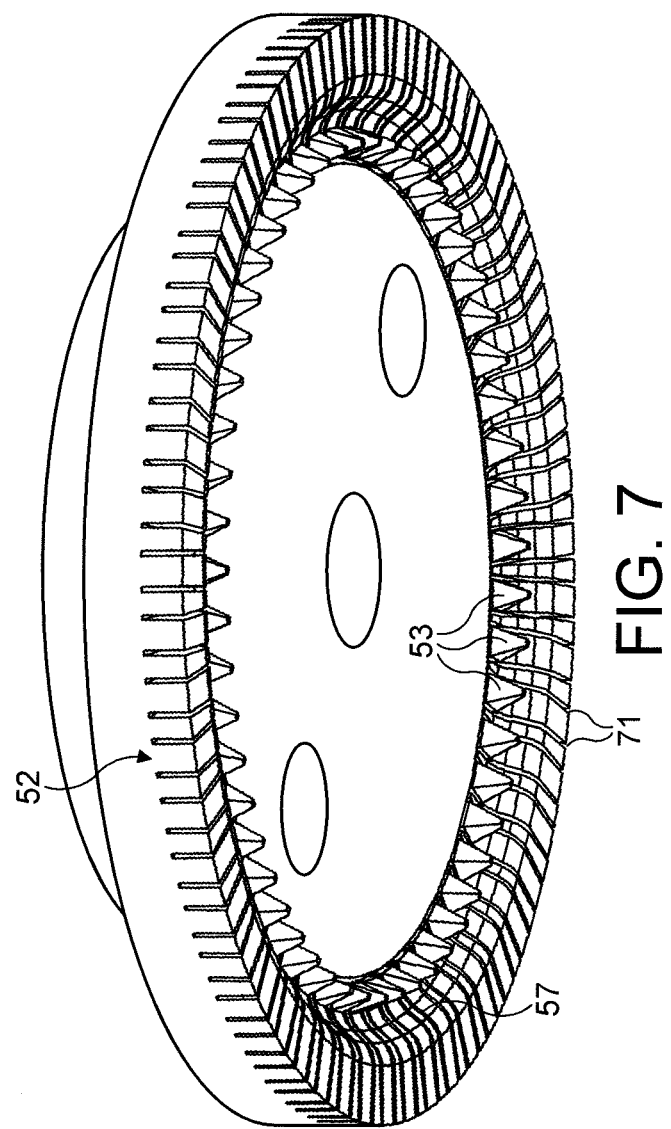
FIG. 7 is a perspective view of the engaging part of the water injection head of the device.

As shown in FIG. 7, small flow distribution slots 71 may be provided downstream of the injection head. An annular collecting recess 57 may be provided between the elements 53 and the slots 71 to provide a more uniform distribution of the volume of liquid. The slots may be provided through a clamping peripheral edge 52 of the engaging part which edge provides a clamping force onto the sealing edge 4 of the capsule.

The slots may be sized so that many jets of beverage are produced which impact centrifugally at relatively high speed on the impact wall 62 of the device. For instance, each slot may have a size of from 0.05 and 1.0 mm. The number of slots may be variable. For instance, between 4 and 200 slots, preferably between 30 and 100 slots, can be provided.

According to a non-illustrated alternative, the piercing elements 53 can be hollow to let the liquid pass there through. However, since hollow elements would be much more prone to blocking by small solid particles (e.g., ground coffee particles), a separate filter in the capsule would likely be recommended to reduce such risk.

According to one aspect of the invention, the water injection subassembly 29 further comprises a valve system for controlling the flow of liquid that is discharged from the device. The valve system can be arranged on the capsule rotary engaging part in the form of an annular engaging portion which is biased under the force of elastic loading means such as springs. The annular engaging portion includes a pressing peripheral surface which applies a closing force on the peripheral rim 4 of the capsule to be able to restrict the flow of liquid under the force of the elastic loading means. The surface can form a cone or "V" for increasing the sealing pressure in a localized area. The engaging portion further comprises an internal base portion. The elastic loading means is thus inserted in a space located between the base portion and a counter-force portion of the engaging part. Therefore, at a rest position, the engaging portion of the valve system keeps closing on the rim of the capsule under the compressive effect of the resilient means.

As already mentioned, connection means 31 are provided for the relative connection of the two subassemblies 29, 30. For example, small pins 65 are provided on the side of the tubular surface of the water injection subassembly 29 which can engage side locking openings 66 on the tubular surface of the liquid receiving subassembly 30.

Therefore, connection between the two subassemblies can be carried out by a rotational angular or helical closure movement for enabling the pins to engage the oblong openings 66. Of course, other connection means can be envisaged to replace this bayonet-type connection means. For instance, a threading means or a translational closure means can be envisaged by any person skilled in the art.

The capsule system of the invention works basically according to the following principle. The capsule device is opened by moving the two subassemblies 29, 30 relatively one another, e.g., by disconnecting the bayonet-type connection and separating the two subassemblies' 29, 30. As a result, a single-use sealed capsule 1 containing a food substance can be inserted in the device, i.e., placed in the cavity of the rotating drum 36. The capsule can be placed in the device while the capsule being gastightly closed by the sealing foil 3. The device is then closed by the subassembly 29 being connected back onto the subassembly 30 and locked by the connection means. In the locked position, the capsule is opened by the water injector that pierces through the sealing foil of the capsule and introducing itself through the water inlet 35 of the capsule. At the same time, during closure the membrane can be weakened at the periphery of the sealing foil by the outlet piercing members 53. Weakening of the membrane may consist in forming small imprints in the membrane or small through-holes. Water can thus be introduced in the capsule via the central water injector 45. Venting holes can be produced in the injection subassemblies to allow gas to escape the capsule while water is introduced in. The capsule can be driven in rotation by activating the rotary motor 40. The start of the centrifugal operation can be carried out at the same time as water injection starts being introduced in the capsule or slightly after or before this water injection operation starts.

For instance, it might be advantageous for brewing ground coffee, to allow during several seconds water to fill in the capsule before starting the centrifugal operation by rotating the capsule. Thus, water can properly infiltrate in the coffee before, the liquid is centrifuged thereby avoiding coffee areas to remain dry.

The centrifugation is carried out by rotating the capsule around the central axis I of rotation of the device that is preferably aligned to the central axis A of the capsule. The rotational speed is preferably of from 1000 to 16000 round-per-minute (rpm), more preferably of from 1500 to 10000 rpm. A control unit can be provided in the device for setting the rotational speed according to the nature of the liquid to be brewed and/or the substance in the capsule. The higher the rotational speed, the higher the pressure is exerted at the peripheral wall of the capsule and the more the substance is compacted on the sidewall and perforable membrane of the capsule. It is important to notice that higher rotational speeds promote brewing of coffee extract containing a lower solid content since the residence time of liquid in the coffee bed is shorter.

Lower rotational speeds provide coffee of higher strength (coffee solid content) since the residence time of liquid in the capsule is longer. Brewing takes place in the capsule by water traversing the substance thereby providing an extraction or partial or total dispersion or dissolution of the substance. In a first brewing phase, no liquid is allowed to leave the capsule since the outlets are insufficiently opened or even not yet provided in the membrane.

Under the effect of centrifugal forces, the substance, such as coffee powder, tends to compact itself radially against the peripheral walls 7, 17 of the enclosure of the capsule whereas water is forced to flow through the substance. This results in the substance being both compacted and intimately wetted by water. Due to the high rotational movement of the capsule, the centrifugal forces exert themselves uniformly on the mass of the substance. Consequently, the water distribution is also more uniform compared to usual methods using a pressure pump to exert the pressure in the capsule. As a result, there is a lower risk of preferential flow path through the substance which could lead to areas which are not properly wetted and so not properly brewed, dispersed or dissolved. With ground coffee powder, the liquid that reaches the internal sidewall of the capsule is a liquid extract.

As the liquid pressure at the membrane of the capsule increases, the liquid extract is forced to flow upwards along the internal surface of the sidewall of the capsule. The widening of the sidewall 7 of the capsule promotes the upward flow of the liquid in the capsule in direction of the openings. As a result, the membrane 3 deforms and is consequently pierced against the piercing elements 53. As a result, a centrifuged liquid is allowed to pass through the plurality of outlet openings 18 provided in the capsule, e.g., through the lid 8. This results in a second delivery phase which takes place during which the liquid is released through the pierced outlets.

Also as aforementioned, the outlet openings also provide flow restrictions that impact on the interaction of water with the substance and on the creation of foam or cream on the top of the beverage. The flow restrictions create shear forces and consequently generate foam or coffee cream. Some gas contained in the capsule can become entrapped in the liquid and provides, due to the pressure release after the flow restriction, a multitude of small bubbles in the liquid.

The delayed opening of the membrane of the capsule depends on various parameters such as the centrifugal speed, the characteristic of the membrane (tear strength, thickness), the shape of the piercing elements, etc.

The system capsule of the invention provide remarkable brewing results with solid contents which are higher than with usual systems. The results are very reproducible from capsule to capsule. Surprisingly, cream is also remarkably improved with a creamier, more stable and thicker texture.

Of course, the invention may encompass many variants which are included in the scope of the patent claims that follow.

What is claimed is:

1. A liquid food preparation system for preparing a liquid food from a food substance comprising a device and a capsule removably insertable in the device by passing water through the substance in the capsule, which system comprises:
    a closed capsule comprising a peripheral wall and having a central axis,
    a capsule holder for holding the capsule in the device,
    a water injection head for injecting water in the capsule comprising a rotary engaging member for engaging the capsule and forming a secure association between the capsule and the capsule holder, and
    a water injector in fluid association with the water injection head and arranged for introducing water into the capsule,
    opening members placed relatively offset to the central axis of the capsule holder and protruding from an interior surface of the device adjacent to an upper portion of the capsule, and
    a rotational driving assembly comprising a rotary motor driving the capsule in centrifugation, and
    wherein the opening members are elements; and are configured relative to the peripheral wall of the capsule in the device to create a plurality of liquid delivery outlets in the peripheral wall of the capsule when a liquid within the capsule exerts a pressure against the peripheral wall of the capsule that exceeds a threshold pressure and forces the peripheral wall to be penetrated by the opening members to form the delivery plurality of liquid outlets.

2. The system according to claim 1, wherein the elements which are distant or in contact with the peripheral wall of the capsule when the water injection head and capsule holder are closed about the capsule and the liquid delivery outlets are created by deformation of the peripheral wall of the capsule against the opening members as the pressure of liquid increases on the peripheral wall of the capsule.

3. The system according to claim 1, wherein the opening members comprise a series of piercing elements distributed along a substantially circular path about the central axis of the capsule holder.

4. The system according to claim 3, wherein the piercing elements form a puncture crown at a periphery of the rotary engaging member.

5. The system according to claim 3, wherein the piercing elements form truncated pyramids, needles and/or blades.

6. The system according to claim 1, wherein the water injector comprises a piercing member, and wherein the peripheral wall of the capsule is sloped from a narrower capsule bottom to a wider capsule top portion to assist in directing the liquid to the outlets when the capsule is rotated.

7. The system according to claim 6, wherein the piercing member is arranged as a hollow piercing tube for injecting water in the center of the capsule.

8. The system according to claim 7, wherein the piercing member has a diameter of less than 5 mm.

9. The system according to claim 7, wherein the piercing member has a diameter of between 0.9 and 2.9 mm.

10. The system according to claim 1, wherein the capsule comprises a puncturable membrane into which is formed the liquid delivery outlets.

11. A method for preparing a food liquid from system according to claim 1 by passing water through the food substance contained in the capsule, which method comprises:
   driving the capsule in centrifugal rotation while introducing the water into the center of capsule to increase the pressure inside the capsule while allowing the water to contact the substance to form a food liquid,
   providing at least one liquid delivery outlet in the capsule when the pressure against the peripheral wall of the capsule exceeds the threshold pressure and forces the peripheral wall to be penetrated by the opening members; and
   allowing the food liquid to exit the capsule through the liquid delivery outlets by the effect of the centrifugal forces of liquid exerted in the capsule as a result of the centrifugal rotation.

12. The method according to claim 11, wherein the food liquid is forced in direction of the peripheral wall of the capsule which widens in direction of the upper portion of the capsule.

13. The method according to claim 11, wherein the capsule includes a perforable membrane that is sealed onto a flange-like rim of a cup-shaped body of the capsule containing the substance food.

14. The method according to claim 11, wherein water is introduced into the capsule through an opening of less than 5 mm.

15. The method according to claim 11, wherein water is introduced into the capsule through an opening of between 0.9 and 2.9 mm.

16. A liquid food preparation system for preparing a liquid food from a food substance comprising a device and a capsule removably insertable in the device by passing water through the substance in the capsule, which system comprises:
   a capsule comprising a peripheral wall and having a central axis,
   a capsule holder for holding the capsule in the device,
   a water injection head for injecting water in the capsule comprising a rotary engaging member for engaging the capsule in a closure onto the capsule holder, and a water injector in fluid association with the water injection head and arranged for introducing water into the capsule,
   a rotational driving assembly comprising a rotary motor driving the capsule in centrifugation,
   wherein opening members are placed relatively offset to the central axis of the capsule holder and are configured relative to the peripheral wall of the capsule in the device to create a plurality of liquid delivery outlets in the peripheral wall of the capsule when an internal pressure of a liquid against the peripheral wall of the capsule exceeds a threshold pressure; and
   wherein the opening members are elements which are distant or in contact with the peripheral wall of the capsule when the water injection head and capsule holder are closed about the capsule and the outlets plurality of liquid delivery are created by deformation of the peripheral wall of the capsule against the opening members as the pressure internal of liquid increases on the peripheral wall of the capsule.

* * * * *

UNITED STATES PATENT AND TRADEMARK OFFICE
CERTIFICATE OF CORRECTION

| | | |
|---|---|---|
| PATENT NO. | : 8,919,242 B2 | Page 1 of 1 |
| APPLICATION NO. | : 13/061558 | |
| DATED | : December 30, 2014 | |
| INVENTOR(S) | : Perentes et al. | |

It is certified that error appears in the above-identified patent and that said Letters Patent is hereby corrected as shown below:

Title Page:
Page 3, Item (56) References Cited, FOREIGN PATENT DOCUMENTS, delete "WO2007/014564" and insert -- WO 2007/014584 --.

In the Claims:
Column 12:
Line 35 (claim 1, line 21), delete "elements;" and insert -- elements --.
Line 42 (claim 1, line 28), delete "delivery plurality of liquid" and insert -- plurality of liquid delivery --.

Column 13:
Line 30 (claim 13, line 4), delete "substance food" and insert -- food substance --.
Lines 28-29 (claim 16, lines 25-26), delete "outlets plurality of liquid delivery" and insert -- plurality of liquid delivery outlets --.
Line 31 (claim 16, line 28), delete "pressure internal" and insert -- internal pressure --.

Signed and Sealed this
Twenty-first Day of April, 2015

Michelle K. Lee
*Director of the United States Patent and Trademark Office*